Patented Dec. 8, 1936

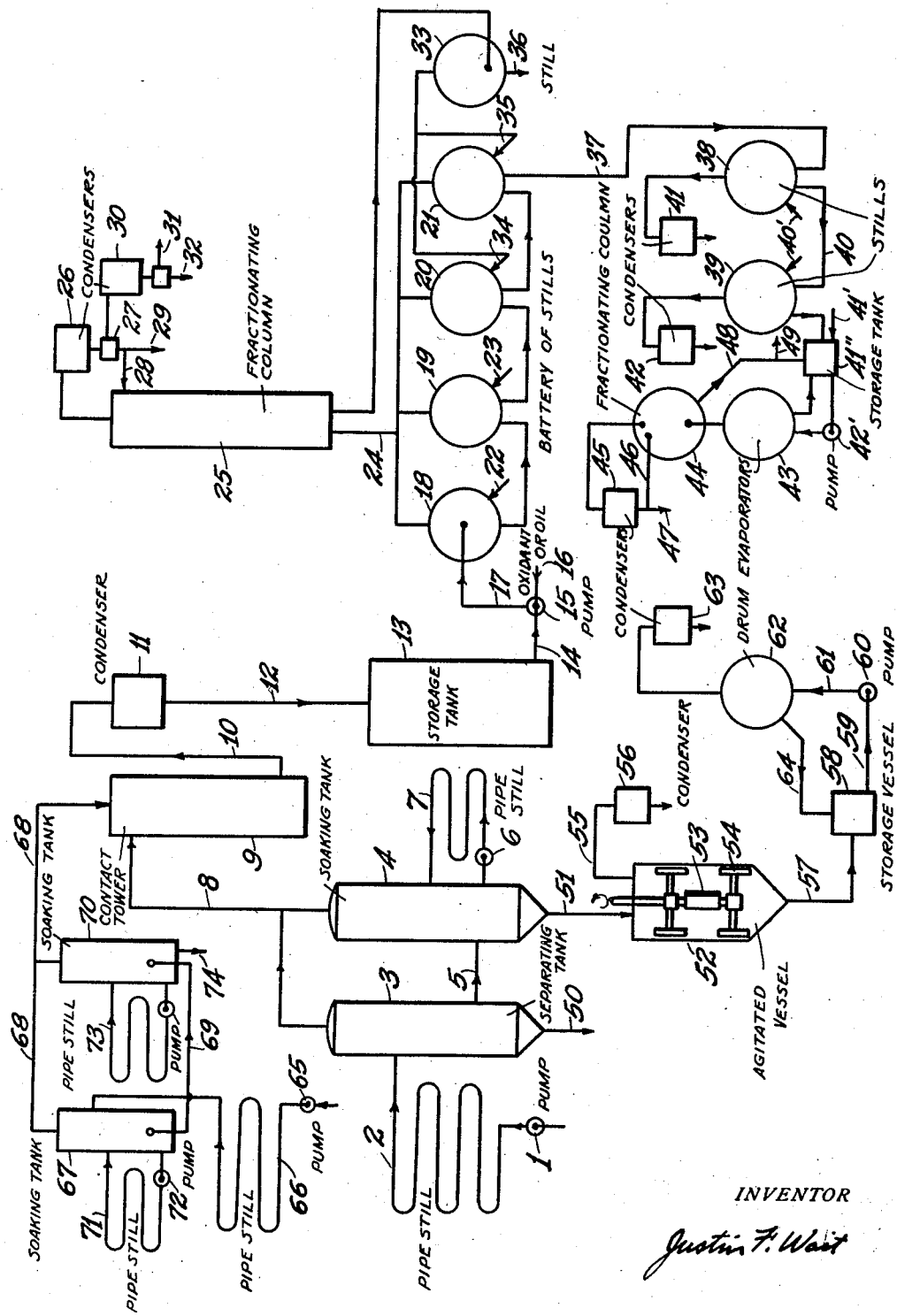

2,063,861

UNITED STATES PATENT OFFICE 2,063,861

PROCESS OF REFINING PETROLEUM OIL

Justin F. Wait, New York, N. Y.

Application May 24, 1933, Serial No. 672,572

7 Claims. (Cl. 196—35)

This invention relates to improvements in the art of refining petroleum and wherein active light metal is utilized for treatment of the oil. In particular it refers to the combination of such treatment with metal and special fractionation methods utilized to cooperate therewith in removing impurities and altering the molecular structure of the oil. This application is a continuation in part of Ser. No. 613,080 filed May 23, 1932, and it is further related to co-pending applications including Ser. Nos. 671,187 filed May 15, 1933; 671,616 filed May 18, 1933, and 671,895 filed May 19, 1933.

Among the light active metals which may be applied for the treatment of oil are those with one unpaired electron including sodium, potassium and aluminum. Such metals may be utilized in association with compounds of such metals my preference being for hydroxides and chlorides appropriately mixed to give desired activity and fluidity. The temperature of application is preferably between about 250° C. and 500° C. wherefor I take advantage of the high degree of activity of the petroleum as well as the metal. The metal may be at the same temperature as vapors of oil being treated or at a higher temperature. A portion of the oil may be treated in the liquid phase.

Although it has been suggested that alkali metals and alkaline earth metals might be used for treating oil, the proposed application appears to have been limited to the removal of sulfur or sulfur compounds from gasoline. The suggested and described methods of application fail to provide for conditions which are necessary to the realization of a practical effect and in particular they fail to recognize that extensive purification and molecular rearrangement of oil may be promoted by application of such metals and compounds in proper manner. It has previously been considered desirable to use temperatures below about 200° C. and in some instances room or lower temperatures. Proper contact has not been assured or the method has been such as to prevent continued use of a mass of metal or adequate recovery thereof. Compounds have not been utilized with such metals and if at all in a wet condition. The metals have not been applied to freshly formed or freshly treated oil and vapors and their use has been limited to oils which have been altered considerably by storage.

By one phase of my invention appropriate portions of freshly treated and formed oils are contacted with fused active metals and metallic compounds. Oil is cracked and the vapors of light cracked products are quickly treated by a molten stream containing light active metal at between 200° C. and 500° C. while the heavy oil, residual to the vapors is separately treated and preferably at between about 200° C. and 350° C. Under the conditions of the treatment molecular rearrangement takes place and impurities are removed with a resulting increase in stability and general improvement of properties of the oil. Losses entailed in operation in other manners are reduced or eliminated. I am thus able to beneficially treat oils of all range.

Prior art has involved treatment of old oil to such a slight extent that there has been no appreciable consumption of alkali metal whereas I control the conditions so that there is a decided consumption which under preferred conditions is considerably in excess of 1 lb. per bbl. and generally between about 5 and about 20 lbs. per bbl. of oil processed. Treatment with metal is combined with heating to cause cracking and rearrangement to the extent that each is required. Mild oxidation is applied before or between treatments with active molten mass to yield desired form and stability. Such oxidation is appreciably less than that previously applied and is extended to a degree that the metal treatment will yield high or highest stability.

The particular mode of operation to be used is dependent upon the nature of the oil and the products desired. It cannot be predetermined and is established by testing oil to be treated by several combinations. In general I establish zones of heating, zone of fractionation and zone of treatment with a molten mass. The oil in liquid or vapor form is advanced and treated to in special manner and generally while hot and without cooling and lengthy storage which I have found to be generally detrimental. Prior applications disclose many steps usable in this invention and indicate results obtainable. By combining such steps it becomes possible to avoid or reduce defficiencies obtained when the steps are not coordinated as indicated herein.

The apparatus features and the process feaures of my invention are illustrated in the drawing. A pump 1 supplies oil which may have been previously treated as by acid or extraction or by appropriate combination of metal and compounds with or without mild oxidation to a pipe still 2 connected with a separating tank 3 serving similarly to a "soaking" tank. A second such tank 4 is connected therewith by means of line 5. A pump 6 and pipe still 7 may be used to circulate and mix the contents of vessel 4 of which there may be a number. This pipe still preferably adds but a fraction of the amount of heat introduced by pipe still 2 and overcomes radiation and supplies heat for evaporation. The temperature within tank 4 is preferably a little above that in vessel 3. If several of vessels 4 are used the last is preferably within 100° F. of vessel 3. The time of flow of liquid through these vessels is preferably less than about twenty minutes.

Separated vapors flow through line 8 to contact tower 9 wherein there is circulated a molten mass containing a small amount of free alkali metal as for example less than one percent or so of sodium in a mixture of hydroxide such as sodium and potassium. The contact tower and method of operation may be as described in French Patents 756,203 and 755,875. The mass is circulated through an outside system which preferably contains means for both separation of impurities and activation by electrolysis. It may also contain means to heat the metal to a temperature above that of the vapors. The contact tower may be in multiple and one used for oxidation as by circulating a molten dinitro aromatic mass therethrough. Such mass may absorb impurities and be recovered as by evaporation.

Treated vapors may flow through line 10 to condenser 11 with outlet 12 to storage tank 13. Vessels 3 and 4 may be under one or several hundred pounds of pressure and the oil therewithin held at cracking temperature. Pipe still 2 is preferably operated so as to yield about 10% or 15% conversion into gasoline although a higher conversion may be attained in accordance with usual practice if desired. The pressure may be reduced in line 8 and/or lines 10 and 12 so that storage tank 13 is under about atmospheric pressure.

The oil is flowed through line 14 to pump 15 and may be mixed with other oil or mild oxidant supplied through line 16. The pump discharges through line 17 to a battery of stills 18, 19, 20 and 21 flowing in series therethrough. These stills are representative of zones of heating and hence digestion. These stills may be of the direct fired type and steam may be introduced as by means of lines 22 and 23. A small amount of air may be introduced with the steam as at 22. Vapors are flowed through line 24 to fractionating column 25 connected with condenser 26, separator 27, back flow line 28 and forward flow line 29. A second condenser 30 is shown to receive and condense other vapors and discharge vapors through line 31 and condensate 32. For high quality of gasoline I prefer to place a contact tower between 27 and 30. A zone of mild oxidation may precede such tower. Back flow may be passed to still 33, passing the resulting oil vapors, which may be wet, through inlets 34 of intermediary still 20 of the series of stills 18, 19, 20, 21, and 33 and oil vapors may likewise be added as to the inlet 35 of still 21. Line 36 may be used to withdraw residual matter from time to time. Such matter is preferably cracked or otherwise worked as by flowing through line 37 with the residual mass from still 21. I prefer to hold temperature gradient between stills 18 and 21 so that the output of 32 will be of gasoline range.

Stills 38 and 39 are connected by line 40 and provided with lines 40' for introducing light vapors or gas which may be introduced and used to agitate and remove moisture. These stills further digest and associate portions of the oil. Condensers 41 and 42 may be used as indicated or they may be separated from the stills by a short fractionating column for mild fractionation. Still 39 discharges to storage tank 41'' supplying pump 42' feeding drum film evaporator or the equivalent 43 (as shown in Ser. No. 670,742 filed May 6, 1933) with special fractionating column 44 which may be as shown in Ser. No. 461,941 filed June 18, 1930. Condenser 45 is provided with back flow line 46 and forward flow line 47. A separator above these lines (not shown) connects with high vacuum means, the fractionating column being controlled so as to have no appreciable back pressure when heavy oils are reached or treated. Vessels 43, 44 and 45 may be in multiple. Alkali metal dispersed in oil may be introduced at the zone of 41. Gases or light vapors may be introduced as indicated by line 41' so that it will be present during evaporation. Such gas may contain a mild oxidant. A contact tower may be provided between vessel 43 and 44 for treating with such metal. Back flow may pass through line 48 to tank 41'' or a portion or all withdrawn as through line 49. Experimentation is required to determine the most suitable method of operation of this and other parts of the system.

Flow of residual oil through soaking and separating tanks including 3 and 4 (several may be used) is such that successive portions are not appreciably mixed, there being a stage by stage reduction in the more volatile or less stable portions. The temperature may be increased from stage to stage. Residual oil may be withdrawn as by means of lines 50 and 51, preferably the latter. Oil from line 37 may if dry be introduced into pump 1 or into vessel 3 or another such as 4 if a multiplicity is used. In this manner reaction is promoted between the heavies of stills 18 to 21 and less stable portions thereof may be cracked. With some oils, I prefer to flow from line 34 into vessel 52 or a similar vessel with agitator arms 54 turned by shaft 53. Residual oil from 51 is flowed into reactor 52 preferably in multiple arrangement. Mild oxidation may be applied to oil before or after introduction into one of these vessels. Alkali metal such as sodium is preferred for treatment of most oils. At a temperature between about 200° C. and 350° C. mild rearrangement occurs and lights fractions are formed and removed as by line 55 and condenser 56. When product from line 37 is treated alone or with product from line 51 there is a considerable amount of such light fractions which may each about 10% or 20% of the total oil treated.

The treated heavy oil is passed through line 57 to storage vessel 58 with connection 59 to pump 60 discharging through line 61 to drum evaporator 62. Vapors are condensed in 63 and circulated liquid returned through line 64. I prefer to add sufficient metal so that roughly a quarter or a half a pound per barrel is present during evaporation. The consumption of sodium or like metal used in treating such oil may be about 5 lbs. to 10 lbs. of metal per bbl. of oil, or higher if oxidation is applied.

In treating some oil I prefer to establish a second and connected zone of cracking. This is represented by pump 65, pipe still 66 and soaking tank 67 with vapor line 68 leading to contact tower 9. Tank 67 preferably discharges as by line 69 to a second tank 70 to permit advancement of the heavy oil. Pipe still 71 with pump 72 may be used to circulate, mix and heat the contents of 67 while a similar still 73 treats the contents of tank 70 preferably held at a somewhat higher temperature. Tanks 67 and 70 are preferably under high pressure slightly greater than that of contact tower 9. In general I prefer that tower 9 and vessels 3 and 4 should be at about a hundred or several hundred pounds pressure. Such pressure is preferably released on leaving condenser 11. The vapors, gas or liquid added by means of line 68 may originate at points such as 29, 31, 32, 39 and 56. It may contain a mild oxidant or small amounts of active metal. The outflow from 50 or 51 may be mixed with oil from one of the above points and flowed through tanks 67 and 70 as indicated. Wax may be separated at one or more points, and it may be formed in applying my process to some oils. Separated wax may be treated to form oils of lubricating and lighter range. One or more of the illustrated steps may be omitted.

Each oil is treated in accordance with experimental findings and in view of the market requirements. In general the degree and points of mild oxidation are governed by the degree of resistance to oxidation required of the final product and the amount of treatment with molten mass and the composition of the mass after oxidation is such as to attain a low gum or sludge value as required. The separation of heavy treated oil for lubricant is dependent upon the requirements and may include contact filtration as for clarification or distillation by mercury as previously described. I do not limit my claims to the exact procedure illustrated.

I claim:

1. In refining petroleum, the steps of flowing oil through a pipe still and applying heat to attain a cracking temperature, separating vapors from liquid, quickly flowing the vapors through a zone of contact with molten mass containing free active alkali metal at between about 300° C. and 500° C., separately cracking oil by flow thereof through a second pipe still and a second separating zone and flowing the fixed gases with not-easily-condensed vapors thereof into the contact zone in contact with vapors from the first pipe still as they are being treated with the alkali metal, so promoting rearrangement of the vapors and combination of portions thereof, condensing vapors so treated and flowing them through a multiplicity of stills with an oxidant to promote mild oxidation of increasing temperature, fractionating vapors therefrom, discharging oil residual to vapors from one still to a second zone of contact and treating the same thereat with alkali metal under reduced pressure at between 200° C. and 400° C. and volatilizing purified oil from the oil and treating agent spread in a thin film and under substantial vacuum.

2. The process of refining petroleum oil which comprises cracking oil, forming gasoline, separating gasoline and heavier vapors from residual oil, treating the residual oil with alkali metal at between about 200° C. and about 300° C., separating light oil so formed by rearrangement from the residual oil and separating purified lubricant from the metal and altered impurities, fractionating the vapors to form gasoline, treating heavier portions of the separated vapors with a mild oxidant to render unstable portions removable by treatment with alkali metal and applying alkali metal at between about 200° C. and 350° C. to remove oxidized unstable portions and separating lubricating oil therefrom by evaporation under reduced pressure.

3. In treating oil of petroleum to form gasoline, a heavy lubricant and a light lubricant the process which comprises cracking the oil by applying heat, separating formed vapors and treating them with alkali metal at between 200° C. and 500° C., treating residual oil of the cracking with a mild oxidant and then with the molten mass containing alkali metal at between 200° C. and about 350° C., so forming light fractions and separating them, separating the heavy oil from the metal, and treating heavy portions of the treated vapors with a mild oxidant and subsequently with alkali metal at between about 200° C. and 350° C.

4. In refining petroleum, the process which comprises flowing oil through a pipe still and applying heat to attain a cracking temperature, separating vapors from liquid, quickly flowing the vapors through a zone of contact with molten mass containing free active alkali metal at between about 300° C. and 500° C., separately cracking other oil by flow thereof through a second pipe still and a second separating zone and flowing fixed gases with not-easily-condensed vapors thereof into the contact zone in contact with vapors from the first pipe still as they are being treated with the alkali metal, so promoting rearrangement of the vapors and combination of portions thereof, condensing vapors so treated and flowing them through a multiplicity of stills of increasing temperature, fractionating vapors therefrom, discharging oil residual to vapors from one still to a second zone of contact and treating the same thereat with alkali metal under reduced pressure at between about 200° C. and about 400° C. while forming light fractions from oil so treated and evaporating and recovering improved oil of lubricating range therefrom.

5. In refining petroleum, the process which comprises flowing oil through a pipe still and applying heat to attain a cracking temperature, separating vapors from liquid, quickly flowing the vapors through a zone of contact with molten mass containing free active alkali metal at between about 300° C. and 500° C., separately cracking oil by flow thereof through a second pipe still and a second separating zone and flowing fixed gases with not easily-condensed vapors thereof into the contact zone in contact with vapors from the first pipe still as they are being treated with the alkali metal, so promoting rearrangement of the vapors and combination of portions thereof, condensing vapors so treated and flowing them through a multiplicity of series-connected stills with an oxidant to promote mild oxidation of unstable portions and to render them removable by alkali metal while increasing the temperature and forming vapors therefrom while within the stills, discharging oil residual to vapors from one still to a second zone of contact and treating the same thereat with alkali metal under reduced pressure at between about 200° C. and about 400° C. and volatilizing purified oil from the oil and treating agent spread in a thin film and under substantial vacuum and fractionating and condensing improved and stabilized lubricating oil at the reduced pressure of evaporation.

6. In refining petroleum, the process which comprises flowing oil through a pipe still and applying heat to attain a cracking temperature, separating vapors from liquid, quickly flowing the vapors through a zone of contact with molten mass containing free active alkali metal at between about 300° C. and 500° C., separately cracking oil by flow thereof through a second pipe still and a second separating zone and flowing fixed gases with not-easily-condensed vapors thereof into the contact zone in contact with vapors from the first pipe still as they are being treated with the alkali metal, so promoting rearrangement of the vapors and combination of portions thereof, condensing vapors so treated and flowing them through a multiplicity of stills with an oxidant to promote mild oxidation of unstable portions and to render them removable by alkali metal, increasing temperature of the oil flowed through the stills and forming vapors therefrom, discharging oil residual to vapors from one still to a second zone of contact and treating the same thereat with alkali metal under reduced pressure at between about 200° C. and about 400° C. and volatilizing purified oil from the oil and treating agent under substantial vacuum and fractionating and condensing improved and stabilized lubricating oil at the reduced pressure of evaporation while maintaining the zones of cracking, separation and contact under substantial pressure.

7. The process which comprises flowing oil through a cracking still to a zone of separation, treating the freshly formed vapors with a molten mass containing alkali metal at between about 300° C. and 500° C. to purify and improve the vapors, liquefying heavier portions of the so treated vapors and distilling the liquid at elevated temperatures for a substantial period while forming vapors and subsequently treating heavier portions of oil residual to the vapors with a mild oxidant to render unstable portions removable by application of alkali metal at elevated temperature and distilling the so oxidized oil under vacuum in the presence of alkali metal at between about 200° C. and about 400° C. and separating and recovering portions of lubricating range.

JUSTIN F. WAIT.